United States Patent [19]
Davidson

[11] Patent Number: 6,025,425
[45] Date of Patent: Feb. 15, 2000

[54] STABILIZED POLYMER COMPOSITIONS

[75] Inventor: Neil Shearer Davidson, Stirling, United Kingdom

[73] Assignee: BP Chemicals Limited, London, United Kingdom

[21] Appl. No.: 08/766,297

[22] Filed: Dec. 13, 1996

[30] Foreign Application Priority Data

Dec. 22, 1995 [GB] United Kingdom .................. 9526432

[51] Int. Cl.⁷ ................................ C08J 5/10; C08K 3/34
[52] U.S. Cl. .......................... 524/456; 524/442; 524/445
[58] Field of Search .................................. 524/443, 442, 524/444, 445, 447, 448, 449, 450, 451, 452, 456

[56] References Cited

U.S. PATENT DOCUMENTS

| | | | |
|---|---|---|---|
| 3,684,197 | 8/1972 | Ashton et al. ............................. | 241/26 |
| 4,420,341 | 12/1983 | Ferrigno .............................. | 106/308 Q |
| 4,837,400 | 6/1989 | Walter et al. ............................. | 524/145 |
| 4,851,470 | 7/1989 | George .................................... | 524/612 |
| 5,166,252 | 11/1992 | George .................................... | 524/449 |
| 5,229,094 | 7/1993 | Clauss et al. ........................... | 423/331 |
| 5,264,030 | 11/1993 | Tanabe et al. .......................... | 106/401 |

FOREIGN PATENT DOCUMENTS

| | | |
|---|---|---|
| 306116 | 3/1989 | European Pat. Off. . |
| 2249549 | 5/1992 | European Pat. Off. . |
| 0 598 310 A1 | 11/1993 | European Pat. Off. . |

*Primary Examiner*—James J. Seidleck
*Assistant Examiner*—U. K. Rajguru
*Attorney, Agent, or Firm*—Fay, Sharpe, Fagan, Minnich & McKee

[57] ABSTRACT

A polymer composition comprises (a) a major amount of a polyketone and (b) a minor amount of an amorphous silicate. The amorphous silicate preferably a trisilicate can be a silicate of a Group II metal, for example magnesium. The amorphous silicate is used as a stabilizer in polymer compositions comprising polyketones.

10 Claims, No Drawings

STABILIZED POLYMER COMPOSITIONS

The present invention relates to a stabilised polymer composition containing a polymer of carbon monoxide and one or more olefins. In particular the invention relates to compositions containing such polymer which exhibit good melt processing stability in processes during which the composition is melted and subsequently solidified.

The preparation of random copolymers comprised of a minor amount of carbon monoxide and a major amount of ethylene by catalysed radical polymerisation has been known for some years. More recently it has been found that linear alternating polymers of carbon monoxide and one or more olefins, hereafter called polyketones, can be prepared by contacting the reactants with a Group VIII metal catalyst preferably comprised of palladium and a bidentate phosphine, see for example EP 121965 and EP 619335.

Polyketones whilst being thermoplastics, suffer from the disadvantage that they have relatively high melting points which are close to the temperatures at which they undergo chemical degradation. This causes a problem since the materials are thus difficult to process using conventional melt processing technology.

In order to overcome this problem a number of potential approaches have been explored. EP213671 teaches that polyketones comprised of carbon monoxide, ethylene and alpha olefin (e.g. propylene) units have lower melting points than corresponding copolymers of ethylene and carbon monoxide comprised only of carbon monoxide and ethylene units and can thus be processed at lower temperatures where the rate of thermal degradation is slower. Whilst this approach goes some way to alleviating the problem, there is still a need to improve further the melt processing stability of polyketones if they are to be processed on a commercial scale.

Methods of further improving melt processability have centred around a) the blending of polyketones with other polymers, b) the addition of plasticisers and c) the use of additives claimed to interfere with the degradation reactions which the polyketones undergo. The first two types of approach suffer in that relatively large amounts of the second polymer or plasticiser are required, a consequence of which is that there is a general deterioration in the physical, mechanical and barrier properties of the polyketone. An example of the third type of approach is disclosed in EP 310166. This patent teaches the addition of an aluminium alkoxide or a derivative thereof. Examples of preferred additives are those having the general formula $Al(OR)_3$ where each R is independently $C_1$ to $C_{12}$ alkyl. It is stated in EP 310166 that the precise form of the aluminium species present in the final composition is not known with certainty and may depend upon a number of factors.

It is further disclosed in EP 326224 that aluminium hydroxide in its various forms optionally with other aluminium oxygen compounds such as in natural boehmite can be used to improve melt-processability.

It has now been found that the melt processability of polyketones can be improved by the addition of certain silicates.

U.S. Pat. No. 4,851,470 discloses polymer compositions comprising a major amount of polyketone and a minor amount of a mineral filler. Among the mineral fillers disclosed are talc and wollastonite, both crystalline silicates. However, these materials were used as fillers and were not in any way used or disclosed as stabilisers for the polyketone. In fact we have demonstrated that such crystalline fillers have little or no stabilising effect on the polyketone.

On the other hand we have found that amorphous silicates have a stabilising effect on polyketones.

According to the present invention there is provided a polymer composition which comprises (a) a major amount of a polyketone and (b) a minor amount of an amorphous silicate.

For the purposes of this patent, polyketones are defined as linear polymers having an alternating structure of (a) units derived from carbon monoxide and (b) units derived from one or more olefins. Suitable olefin units are those derived from $C_2$ to $C_{12}$ alpha-olefins or substituted derivatives thereof or styrene or alkyl substituted derivatives of styrene. It is preferred that such olefin or olefins are selected from $C_2$ to $C_6$ normal alpha-olefins and it is particularly preferred that the olefin units are either derived from ethylene or most preferred of all from a mixture of ethylene and one or more $C_3$ to $C_6$ normal alpha-olefin(s) especially propylene. In these most preferable materials it is further preferred that the molar ratio of ethylene units to $C_3$ to $C_6$ normal alpha-olefin units is greater than or equal to 1 most preferably between 2 and 30.

The polyketones described above are suitably prepared by the processes described in EP121965 or modifications thereof. In general terms, this comprises reacting carbon monoxide and the chosen olefin(s) at elevated temperature and pressure with a catalyst which is preferably comprised of palladium, a bidentate phosphine, such as bis (diphenylphosphino)propane, and an anion which either does not coordinate to the palladium or coordinates only weakly. Examples of such anions include p-toluenesulphonate, tetrafluoroborate, borosalicylate and the like. Alternatively, the polyketones can be prepared by the process described in EP 619335 wherein an organoboron cocatalyst is used. The process is suitably carried out at a temperature in the range 50 to 150° C., a pressure in the range 25 to 75 bar gauge and in a solvent such as methanol, acetone, THF or the like.

As regards component (b) of the polymer composition, this is an amorphous or poorly crystalline insoluble silicate. It is preferably an amorphous silicate of a group II metal for example magnesium, calcium or strontium, preferably magnesium. It is preferable that the silicate is a trisilicate. Typically the silicates have the formula $xMO.ySiO_2.nH_2O$ where $n \geq 0$, $x:y=1–10$, x and y are not 0, M is a metal preferably a group II metal. The silicates used in the present invention are insoluble in aqueous solution or only soluble to small extent. The surface area of the silicate can vary but it is typically greater than 50 $m^2g$, preferably greater than 200 $m^2g$. The average particle size of the silicate can also vary; it is typically in the range 0.1 to 100 preferably 0.5 to 20 more preferably 1 to 10 microns. It is important that where the polymer composition is to be used for packaging films that the average particle size of the silicate is less than 5 micron preferably about 1 micron.

The amorpous insoluble silicate is typically formed synthetically for example by a precipitation reaction of soluble silicate with a salt or in an autoclave by a hydrothermal reaction.

The amount of amorphous silicate used will be such as to stabilise the polymer against degradation during melt processing and should be in the range 0.01 to 5.0 parts per hundred parts by weight of the total composition, preferably 0.1 to 3.0, more preferably 0.3 to 2.0. The total weight of the composition consists of the weight of polyketone and amorphous silicate but excluding all other components.

The amorphous silicate can be incorporated into the polyketone by essentially any known method provided that intimate mixing is achieved. For instance, providing they do not interfere with the polymerisation reaction they could be incorporated into the polymerisation mixture prior to or during polymerisation. Alternatively, they can be mixed with the polymer after polymerisation is complete by direct mixing with the polymer produced or by adding as a solution/dispersion in a suitable solvent which is subsequently volatilised out of the composition.

For example the amorphous silicate can be incorporated by blending finely divided stabiliser with polyketone powder in a high speed mixer (e.g. Papenmeir Universal High Speed Mixer). Intimate mixing is then achieved when the polymer is molten by shearing in a batch mixer or continuous extruder.

In addition to the components defined above the composition may contain other additives such as antioxidants, blowing agents, UV stabilisers, fire retardants, mould release agents, lubricants/processing aids, fillers and other materials conventional in the art. The composition can also be a blend of polyketones with other known commercial thermoplastics.

The compositions of the present invention may be readily melt processed and hence can be used in the manufacture of containers for food and drink, packaging materials, automotive parts, wires, cables and structural items for the construction industry.

In a further aspect of the present invention there is provided an amorphous silicate for use as a stabiliser in a polymer composition comprising a polyketone.

In a further aspect of the present invention there is provided a moulded article comprising a polymer composition as defined hereinbefore.

The following Examples now illustrate the invention.
Polymer Process Evaluation Procedure Polyketone(ethylene-propylene-carbon monoxide terpolymer) was processed on a Brabender Plasticorder, a laboratory batch melt mixer, and the torque on the rotors and the melt temperature were monitored over 30 minutes. The processing was carried out with a rotor speed of 60 rpm and at an initial chamber temperature of 215±2° C. under a nitrogen atmosphere achieved by a flow of nitrogen passing through the rotor shafts and also over the top of the loading shute.

The stabiliser additive was mixed with the polymer powder charge in a beaker prior to processing on the Brabender Plasticorder. In addition, in each case, processing was carried out in the presence of 1 part per 100 parts polyketone of an oxidised polyethylene wax, Irgawax 371 by Ciba Geigy, which acts as a mould release.

On addition of the polymer to the mixer the torque rises as the polymer fuses then drops within a few minutes, as the polymer completely melts and the temperature equilibriates, and reaches a minimum valve. Increase in torque with time beyond this minimum is indicative of increasing viscosity due to crosslinking reactions. Also, as the viscosity increases the melt temperature increases due to the heat of mechanical work. A stabilising effect is manifested as a reduction in the rate of torque increase and melt temperature increase.
Melt Flow Rate Determination The melt flow rate (MFR) of the polymer was measured using a Davenport Melt Index Tester. Tests were carried out at a temperature of 240° C. with an applied load of 5 kg. The MFR was calculated from the weight of extrudate pushed through the die over a 30 second period on application of the load, 3 minutes after charging the polymer into the barrel of the instrument at temperature. Otherwise standard MFR procedures were followed.

A decrease in MFR of a given material after a process history is indicative of increased viscosity due to crosslinking reactions. A stabilising effect is evidenced by protection against or limitation of such a decrease in MFR.

The additives used in the following examples are:

| | |
|---|---|
| magnesium trisilicate 1 - (MTS1) | supplied by Fluka Chemie AG |
| magnesium trisilicate 2 - (MTS2) | light grade (light pharmaceutical 300) supplied by Pennine Darlington Magnesia Ltd surface area 250–350$m^2g^{-1}$ average particle size 5–10$\mu$m |
| magnesium trisilicate 3 - (MTS3) | heavy grade (light pharmaceutical 400) supplied by Pennine Darlington Magnesia Ltd surface area 250–350$m^2g^{-1}$ average particle size 5–10$\mu$m |
| magnesium trisilicate 4 - (MTS4) | grade with a high surface area of approx. 400$m^2g^{-1}$ to 500$m^2g^{-1}$ supplied by Crosfield Group average particle size 5–10$\mu$m |
| magnesium trisilicate 5 - (MTS5) | grade with a surface area of 90 to 100$m^2g^{-1}$ and a high specific absorption characteristic supplied by Crosfield Group average particle size 5–15$\mu$m |
| magnesium trisilicates 1–5 are amorphous | |
| calcium silicate | supplied by Aldrich Chemical Company Ltd |
| sodium trisilicate | supplied by Aldrich Chemical Company Ltd |
| talc | hydrous magnesium silicate mineral (crystalline) supplied by Mircofine Minerals Ltd under the designation Nytal 300 |
| wollastonite | calcium silicate mineral (crystalline) supplied by Microfine Minerals Ltd under the designaiton Vansil EW20 |
| amorphous silica gel | supplied by Aldrich Chemical Company surface area 500$m^2g^{-1}$ |

EXAMPLE 1

A polyketone characterised in having a melting point of 203° C. (defined as the peak of the melting endotherm on second heating measured by DSC scanning at 10° C./min. on second heating, after heating to 240° C. and cooling to 50° C. at the same rate under an inert atmosphere) and a melt flow rate measured at 240° C. and 5 kg of 3 g/min. was processed as described above with various silicates.

The processing responses and resultant melt flow rates are tabulated below.

| Additive | Amt. (pph) | Minimum Torque (Nm) | Final Torque (Nm) | Final Melt Temp (°C.) | Resultant MFR @ 240° C./ 5 kg (g/10 mins) |
|---|---|---|---|---|---|
| None | — | 4.0 | 6.3 | 216 | 4.7 |
| magnesium trisilicate 1 (MTS1) | 0.1 | 3.9 | 4.6 | 215 | 10.6 |
| | 0.3 | 3.8 | 4.4 | 213 | 12.7 |
| | 0.5 | 3.9 | 4.5 | 214 | 12.1 |
| | 1.0 | 4.2 | 4.6 | 215 | 11.1 |
| | 2.0 | 4.1 | 4.7 | 215 | 9.7 |
| calcium silicate | 0.3 | 3.9 | 5.2 | 215 | 7.9 |

-continued

The processing responses and resultant melt flow rates are tabulated below.

| Additive | Amt. (pph) | Minimum Torque (Nm) | Final Torque (Nm) | Final Melt Temp (°C.) | Resultant MFR @ 240° C./ 5 kg (g/10 mins) |
|---|---|---|---|---|---|
| sodium trisilicate | 0.3 | 4.9 | 8.0 | 219 | 0 |
| talc | 0.3 | 3.8 | 5.9 | 216 | 5.4 |
| wollastonite | 0.3 | 4.1 | 5.9 | 214 | 6.4 |

EXAMPLE 2

A polyketone characterised in having a melting point of 202° C. (defined as the peak of the melting endotherm on second heating measured by DSC scanning at 10° C./min. on second heating, after heating to 240° C. and cooling to 50° C. at the same rate under an inert atmosphere) and a melt flow rate measured at 240° C. and 5 kg of 32 g/10 min was processed as described above with various magnesium trisilicates. The processing responses and resultant melt flow rates are tabulated below.

| Additive | Amt. (pph) | Minimum Torque (Nm) | Final Torque (Nm) | Final Melt Temp (°C.) | Resultant MFR @ 240° C./ 5 kg (g/10 min) |
|---|---|---|---|---|---|
| None | — | 4.2 | 7.8 | 219 | 0 |
| magnesium trisilicate 1 (MTS1) | 1.1 | 4.1 | 6.8 | 218 | 0 |
|  | 0.3 | 3.9 | 5.8 | 216 | 3.3 |
|  | 1.0 | 3.4 | 4.6 | 215 | 9.1 |
|  | 2.0 | 3.6 | 4.5 | 217 | 9.1 |
|  | 3.0 | 3.9 | 4.9 | 216 | 9.4 |
| magnesium trisilicate 2 (MTS2) | 1.0 | 4.1 | 5.1 | 212 | 10.9 |
|  | 2.0 | 3.9 | 4.6 | 212 | 11.2 |
|  | 3.0 | 4.0 | 4.8 | 213 | 9.3 |
| magnesium trisilicate 3 (MTS3) | 1.0 | 3.7 | 4.8 | 214 | 9.4 |
| magnesium trisilicate 4 (MTS4) | 1.0 | 3.6 | 4.8 | 215 | 7.0 |
| magnesium trisilicate 5 (MTS5) | 1.0 | 3.6 | 5.1 | 215 | 3.6 |

EXAMPLE 3

A polyketone characterised in having a melting point of 196° C. (defined as the peak of the melting endotherm on second heating measured by DSC scanning at 10° C./min. on second heating, after heating to 240° C. and cooling to 50° C. at the same rate under an inert atmosphere) and a melt flow rate measured at 240° C. and 5 kg of 43g/10 min. was processed as described above with various magnesium trisilicates. The processing responses and resultant melt flow rates are tabulated below.

| Additive | Amt. (pph) | Minimum Torque (Nm) | Final Torque (Nm) | Final Melt Temp (°C.) | Resultant MFR @ 240° C./ 5 kg (g/10 mins) |
|---|---|---|---|---|---|
| None | — | 2.5 | 4.7 | 218 | 3.1 |
| MTS 1 | 0.1 | 2.4 | 3.6 | 211 | 13.4 |
|  | 0.3 | 2.2 | 3.3 | 211 | 19.9 |
|  | 0.5 | 2.4 | 3.3 | 213 | 21.8 |
|  | 1.0 | 2.1 | 3.1 | 215 | 26.3 |
|  | 2.0 | 2.2 | 2.9 | 213 | 26.4 |
| MTS 2 | 0.1 | 2.4 | 3.7 | 211 | 13.1 |
|  | 0.3 | 2.2 | 3.3 | 213 | 17.9 |
|  | 1.0 | 2.2 | 3.1 | 215 | 25.7 |
| MTS 3 | 0.1 | 2.7 | 4.3 | 211 | 13.0 |
|  | 0.3 | 2.4 | 3.5 | 214 | 15.6 |
|  | 1.0 | 2.2 | 3.1 | 214 | 24.8 |
| MTS 4 | 0.1 | 2.3 | 3.6 | 213 | 13.4 |
|  | 0.3 | 2.3 | 3.4 | 213 | 17.2 |
|  | 0.5 | 2.2 | 3.4 | 214 | 18.6 |
|  | 1.0 | 2.3 | 3.5 | 215 | 21.1 |
|  | 2.0 | 2.6 | 3.5 | 213 | 20.6 |
| MTS 5 | 0.1 | 2.4 | 3.5 | 212 | 14.5 |
|  | 0.3 | 2.9 | 3.7 | 210 | 19.8 |
|  | 1.0 | 2.4 | 3.8 | 213 | 14.4 |
| silica gel | 0.3 | 2.8 | 4.6 | 213 | 3.8 |
|  | 1.0 | 2.7 | 4.7 | 215 | 3.5 |

I claim:

1. A polymer composition which comprises (a) a major amount of a polyketone and (b) a minor amount of an amorphous magnesium or calcium trisilicate.

2. A polymer composition as claimed in claim 1 wherein the silicate has a formula $xMO.ySiO_2.nH_2O$ where $n \geq 0$, $x:y=1-10$, x and y are not 0, M is a metal.

3. A polymer composition as claimed in claim 1 wherein the amorphous silicate has a surface area of greater than 50 $m^2g$.

4. A polymer composition as claimed in claim 3 wherein the amorphous silicate has a surface area of greater than 200 $m^2g$.

5. A polymer composition as claimed in claim 1 wherein the amorphous silicate has a particle size in the range 1 to 10 microns.

6. A polymer composition as claimed in claim 1 wherein the amorphous silicate is present in the polymer composition in an amount of 0.01 to 5.0 parts per hundred parts by weight of the total polymer composition.

7. A polymer composition as claimed in claim 1 wherein the polyketone is an ethylene, propylene carbon monoxide terpolymer.

8. A moulded article comprising a polymer composition as defined in claim 1.

9. A polymer composition which comprises, (a) a major amount of a linear polymer having an alternating structure of (i) units derived from carbon monoxide and, (ii) units derived from one or more olefins and (b) a minor amount of an amorphous magnesium or calcium trisilicate.

10. A polymer composition as claimed in claim 4 wherein the amorphous silicate has a surface area of between 250–350 $m^2g^{-1}$.

* * * * *